United States Patent [19]

Bools et al.

[11] Patent Number: 5,206,810
[45] Date of Patent: Apr. 27, 1993

[54] REDUNDANT ACTUATOR CONTROL

[75] Inventors: William G. Bools, Montgomery; Paul R. Reismiller, West Chester, both of Ohio

[73] Assignee: General Electric Company, Cincinnati, Ohio

[21] Appl. No.: 652,344

[22] Filed: Feb. 7, 1991

[51] Int. Cl.$^5$ .............................................. G05B 19/02
[52] U.S. Cl. ............................. 364/431.02; 318/564; 364/184
[58] Field of Search ............ 364/424.01, 131, 184, 364/434, 431.02; 318/564; 371/68.1, 68.3

[56] References Cited

U.S. PATENT DOCUMENTS

| | | | |
|---|---|---|---|
| 2,938,331 | 3/1960 | Baker | 60/39.16 |
| 3,523,423 | 8/1970 | Young | 60/236 |
| 4,032,757 | 6/1977 | Eccles | 371/68.1 |
| 4,095,420 | 6/1978 | Abernethy et al. | 60/204 |
| 4,105,900 | 8/1978 | Martin et al. | 318/564 |
| 4,115,847 | 9/1978 | Osder et al. | 318/564 |
| 4,130,241 | 12/1978 | Meredith et al. | 318/564 |
| 4,139,887 | 2/1979 | Levesque, Jr. | 60/242 |
| 4,327,437 | 4/1982 | Gelderloos | 371/68.1 |
| 4,489,550 | 12/1984 | Peikert | 60/204 |
| 4,716,531 | 12/1987 | Saunders et al. | 364/431.02 |
| 4,807,516 | 2/1989 | Takats | 318/564 |
| 5,008,561 | 4/1991 | Madeley et al. | 307/80 |

Primary Examiner—Thomas G. Black
Attorney, Agent, or Firm—Jerome C. Squillaro; Bernard E. Shay

[57] ABSTRACT

A control system for operating an actuator in a mechanical system, such as an aircraft turbine engine, employs redundant electronic control channels for increased operational safety in the event of a failure of one of the control channels. In accordance with the reliability or integrity of the various components of the system, a network of triplex redundant electronic control units connects with duplex redundant input driver ports of a servo actuator, the network including a converter of triplex to duplex wherein the converter employs a duplex section of electronic circuits. The control units may include a schedule or memory addressed by a set of input parameters or variables for outputting a desired value of output parameter or variable. The converter includes a fan-in circuit by which signals of the three control units are applied to two power amplifiers for driving the two input sections of the servo actuator. Each input section of the actuator includes a torque motor for converting an electrical signal to a mechanical movement. Electronic sensing of current and voltage of each torque motor is provided for disabling a section of the converter in the event of failure of a torque motor.

19 Claims, 4 Drawing Sheets

REDUNDANT ACTUATOR CONTROL

BACKGROUND OF THE INVENTION

This invention relates to redundant control systems useful in the operation of actuators for control of fuel valve and vanes in a turbine engine, as well as in the control of other mechanical devices and, more particularly, to the implementation of a network of redundant control elements wherein one part of the network employs triplex redundancy and the second part of the network employs duplex redundancy.

Control systems are employed in the operation of complex mechanical devices, such as engines, and apparatus for control of industrial processes. While relatively simple devices can be operated under control of a person, the more complex devices require a control system which aids the person in operating the device. One such device, of considerable interest herein, is a turbine engine suitable for powering an aircraft. A modern aircraft turbine engine has a plurality of parameters which are to be regulated in response to various measurements of temperature, pressure and gas flow to optimize efficiency and to provide desired thrust under various operating conditions. This is accomplished by use of a control system which adjusts settings of inlet guide vanes and exhaust nozzle area in conjunction with the regulation of their flow to a core engine and an augmentor.

Due to requirements of maintaining maximum safety, it is imperative to employ redundant elements in a control system to ensure that acceptable control of the engine is provided even if a defect or failure appears in one of the elements of the control system. It has been the practice to employ triple redundancy of the electronic control units which provide for the scheduled amounts of fuel flow and variable geometry positions in response to various input variables of temperature, pressure, and core or fan speed in an engine having an assembly of plural compressor elements and plural turbine elements. The redundancy is carried forth in each channel of the system for control of respective ones of the output variables such as fuel flow and variable geometry position.

In each of the channels, a servomechanism including a servo actuator is provided for moving a variable engine function in response to an electrical signal inputted to the actuator. The triple redundancy has been carried forth even into the input ports of the actuator such that three mechanical elements are separately driven by three redundant electrical signals to move the actuator. The three electrical signals are produced by the three separate channels within the electronic control unit (ECU). Also, multiple sensors may be employed for sensing a single input variable, such as inlet temperature to the high-pressure compressor, to provide for the feature of redundancy throughout the control system from the sensors through the channels of the control unit and into the input ports of the actuator.

A problem arises in that the level of reliability has increased in some elements of the control system to the point where it is more efficient to employ only duplex redundancy rather than triplex redundancy. For example, at the input ports of the actuator, there is a significant savings in both weight and complexity of the mechanical and electrical interconnections between the actuator and the set of electronic control units inherent in the redundant equipment. A significant savings in weight and complexity can be obtained by reducing the appropriate portion of the redundancy to duplex redundancy from the previously employed triplex redundancy. In addition, power amplifiers of the input channels to the servo mechanism can be operated at one-half their maximum power rating rather than at one-third their maximum power rating upon a reduction of the redundancy from triplex to duplex. Greater linearity and dynamic response can be obtained by operating the amplifiers at half the power rating rather than at one-third the power rating. With respect to the reduction of the number of signal paths in a channel, it is noted that the level of reliability is not necessarily the same for all elements within a channel.

SUMMARY OF THE INVENTION

The aforementioned problem is overcome and other advantages are provided by a redundant control system which, in accordance with the invention, provides for various levels of redundancy in different portions of the system. In a preferred embodiment of the invention, the system is constructed of an electronic control unit arranged with triplex channel redundancy, output signals of these electronic control channels being combined into two power amplifier circuits arranged with duplex redundancy for feeding a servo actuator having two input ports. A distribution of power from the triplex redundant control channels via the duplex arrangement of power amplifiers constitutes a Boolean power distribution system for activation of the actuator of a control channel of the system. The combining of the output signals of the triplex arrangement of control channels is accomplished by use of a fan-in circuit wherein a portion of the output signal of each of the control channels is summed with the corresponding portion of the other control channels at the input of each of the respective ones of the power amplifiers. Each of the electronic control channels includes suitable memory for the scheduling of an output control signal in accordance with a plurality of input variables such as temperature, pressure, and compressor shaft speed.

In accordance with further features of the invention, each input port of the actuator comprises a torque motor for lo converting electrical signals to mechanical motion, each torque motor having a movable element which is displaced in response to an electrical control signal inputted to the torque motor from a respective one of the power amplifiers. Sensing circuitry is provided for monitoring the current and voltage of each torque motor to verify the presence of proper operation of each torque motor. An output signal is provided by each of the monitoring circuits to serve as an enable signal which is applied to respective ones of the power amplifiers. The enable signal allows the power amplifier of the respective ECU channel to remain in operation upon a sensing of proper operation of the torque motor, and disables the power amplifier upon a detection of faulty operation of the solenoid. If desired, suitable fault detection circuitry can also be employed in each channel of the electronic control unit to disable a channel upon a detection of faulty operation. The preferred embodiment of the invention is operative with redundant sensors of input parameters or variables, there being preferably two sensors per input variable. The invention provides for a significant reduction in weight and complexity while retaining a desired level of reliability, this being most advantageous in the construction of an aircraft.

BRIEF DESCRIPTION OF THE DRAWING

The aforementioned aspects and other features of the invention are explained in the following description, taken in connection with the accompanying drawing wherein.

DETAILED DESCRIPTION

Figure 1:
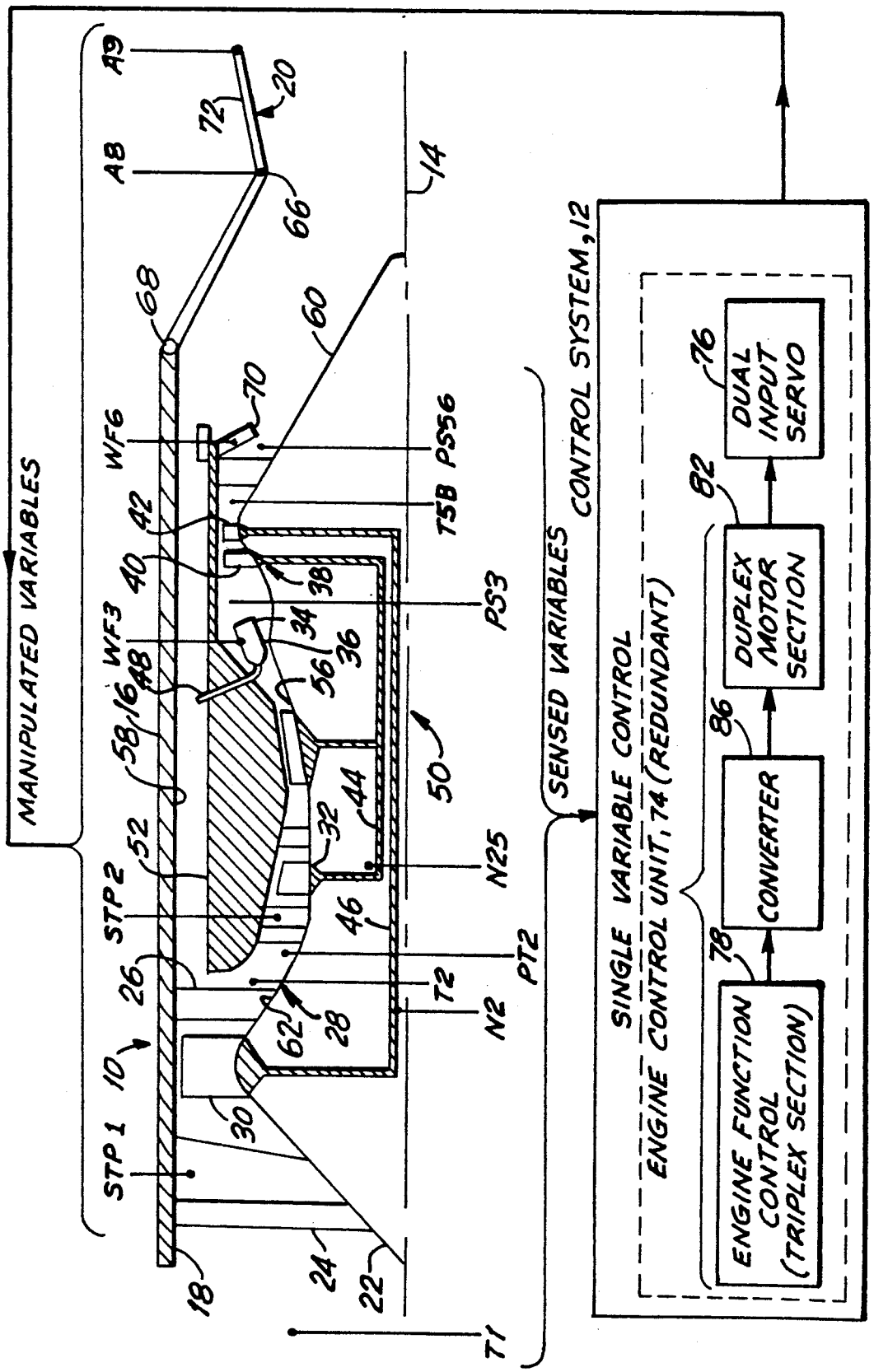
FIG. 1 is a diagrammatic view of a portion of an aircraft turbine engine useful in the practice of the invention.

FIG. 1 shows a diagrammatic view of a portion of a gas turbine engine 10 suitable for use in powering aircraft, the engine 10 including a control system 12 constructed in accordance with the invention. The engine 10 is provided by way of example to demonstrate a use of the control system 12. The engine 10 has various variables which are to be sensed by the system 12 and various variables which are to be manipulated or controlled by the system 12. As will be described subsequently in further detail, the sensed variables are applied as input signals to the system 12, and include variables such as temperature, pressure, and rotation rate. The control variables are provided as output signals of the system 12 and include, by way of example, fuel flow rate and adjustment of output throat cross-sectional area. It is to be understood, however, that the principles of the invention embodied within the control system 12 are applicable to the control of other mechanical devices including engines for other forms of vehicles, mechanical systems employed in manufacturing processes, and manipulative systems such as robotics. The control system 12 is particularly advantageous in the operation of a turbine engine, such as the aircraft turbine engine 10. Accordingly, the ensuing description of the invention will be demonstrated with respect to the control of the engine 10 by the system 12.

The engine 10 has symmetry about a longitudinal axis 14 and, accordingly, the drawing has been simplified by showing only one-half of the engine 10 disposed on one side of the axis 14. The basic engine 10 comprises an outer casing 16 with an air inlet 18 at the upstream end of the engine 10, and an exhaust nozzle 20 at the downstream end of the engine 10. While the principles of the invention are applicable to engines of various configurations, the construction of the engine 10 is provided as an example in the practice of the invention.

The engine 10 comprises a central body 22 centrally positioned relative to the casing 16 by struts, such as the struts 24 and 26, to define airflow passages within the engine 10. Air entering the inlet 18 passes through a compressor assembly 28 which includes, by way of example, a low-pressure compressor 30, and a high-pressure compressor 32 disposed downstream of the low pressure compressor 30. A combustion chamber 34 is located downstream of the compressor assembly 28, and includes an array of burners 36 for combusting fuel to generate a high-velocity exhaust which flows through a turbine assembly 38. The turbine assembly 38 includes, by way of example, a forward turbine 40 and an aft turbine 42. Exhaust gases exiting the turbine assembly 38 pass through the nozzle 20 to produce thrust for propelling a vehicle, typically an aircraft.

A rotor of the high pressure compressor 32 is connected by an outer shaft 44, of annular cross section, to a rotor of the forward turbine 40 whereby the forward turbine 40 rotates the rotor of the high-pressure compressor 32. The rotor of the low-pressure compressor 30 is connected by an inner shaft 46, disposed within and coaxial to the shaft 44, to a rotor of the aft turbine 42 whereby the aft turbine 42 rotates the rotor of the low-pressure compressor 30. A fuel inlet 48 extending from a manifold conducts fuel to the burners 36. The high pressure compressor 32 plus the fuel inlet 48 and combustion chamber 34 in combination with the turbine assembly 38 constitute a core engine 50. An airfoil 52 of annular configuration about the axis 14 is disposed between the casing 16 and the central body 22, and extends downstream to form a housing of the core engine 50. An inner surface of the airfoil 52 in conjunction with an outer surface of the central body 22 defines a main air passage through the high-pressure compressor 32 for directing air into an inlet conduit 56 of the core engine 50. An outer surface of the air foil 52, in conjunction with the casing 16, forms a main bypass duct 58 which extends from the compressor assembly 28 to an exhaust plenum 60 on the downstream side of the aft turbine 42. The compressor assembly 28 includes a conduit 62 which conducts air from the low-pressure compressor 30 to the high-pressure compressor 32, the conduit 62 branching into the main bypass duct 58 for distributing a portion of the inlet air to the main bypass duct 58.

The exhaust nozzle 20 has a throat 66 with variable cross-sectional area. The bypass air becomes entrained with the exhaust gases to pass through the throat 66 of the nozzle 20 as a high-speed jet. Conventional means are provided for obtaining various measurements of shaft speeds, fluid pressures and temperatures of air and exhaust in the various conduits of the engine 10, as well as the area of the throat 66, by way of example. These measurements are employed by the control system 12. Also, conventional means in the form of actuators having plural input drives are employed as will be described below, the actuators providing for the deflection of the valve 68, adjustment of the throat area of the exhaust nozzle 20, and adjustment of the fuel flow at the fuel inlet 48 to the burners 36.

By way of example in the operation of the system 12 with the engine 10, the sensed variables include the inlet temperature T1, the speed of shaft rotation N2 of the inner shaft 46, the temperature T2 at the inlet to the high-pressure compressor 32, the shaft speed of rotation N25 of the outer shaft 44, the pressure PS3 in the combustion chamber 34, the temperature T5 at the outlet of the aft turbine 42, and the pressure PS56 at the forward end of the exhaust plenum 60. As an example of the manipulated or controlled variables in the operation of the system 12 with the engine 10, there are the inlet guide vanes STP1, the inlet guide vanes STP2 at the high-pressure compressor 32, the rate of fuel flow WF3 at the main burner 36, the rate of fuel flow WF6 at an augmentor 70 located at the forward end of the exhaust plenum 60 and aft of the core engine 50, the adjustable cross-sectional area A8 of the throat 66, and the adjustable cross sectional area A9 of the nozzle exit flap 72.

The following control functions are performed. The fan revolution speed is adjusted to set a desired air flow for manipulating a desired amount of fuel from the fuel inlet 48 in accordance with a schedule of engine thrust request. The exhaust nozzle throat area A8 is set in accordance with a schedule to produce a desired thrust at airflow. To manipulate the fuel flow at the augmentor 70, the fuel flow is adjusted in accordance with a schedule in response to engine thrust request to set the augmentation thrust. The inlet guide vanes STP2 are controlled in accordance with a scheduled amount of fan rotation speed and inlet temperature to accomplish a setting of the fan inlet flow angle. The inlet guide vanes STP25 is established in accordance with a scheduled amount of core revolution speed and fan discharge temperature to set a core bypass inlet flow angle. The term fan is employed as an alternative term for identifying the low-pressure compressor 30. A setting of the nozzle exit flap area A9 is accomplished in accordance with a schedule to maximize installed thrust. Adjustment of fuel to the augmentor 70 is accomplished by control of fuel inlet pressure until outlet temperature limits are reached. Also, a deicing valve may be operated with control of temperature and pressure of engine deicing air by accomplishing a mixture of air from two sources for adequate deice within frame and temperature limits.

In accordance with the invention, the control system 12 is provided with a plurality of separate single-variable engine control units (ECU) 74, one of which is shown in FIG. 1. With respect to each of the engine control units 74, the engine control unit 74 serves to adjust an engine parameter such as fuel flow or cross-sectional area of the nozzle throat 66 by means of a dual input servo 76 which is driven by the ECU 74. The dual input servo 76 allows for redundancy of operation which is accomplished by constructing the engine control unit 74 in the form of a redundant network. The engine control unit 74 comprises a function control 78 which is formed as a triplex section of the redundant network of the ECU 74, and has three channels 80 (shown in FIG. 2). The engine control unit 74 further comprises a duplex motor section 82 having two torque motors 84 (shown in FIG. 2) for driving the dual input servo 76. The function control 78 connects with the motor section 82 by means of a converter 86 which interconnects the three channels 80 of the engine control unit 74 to two torque motors 84 for reducing the triplex redundancy of the engine control unit 74 to the duplex redundancy of the motor section 82.

Figure 2:
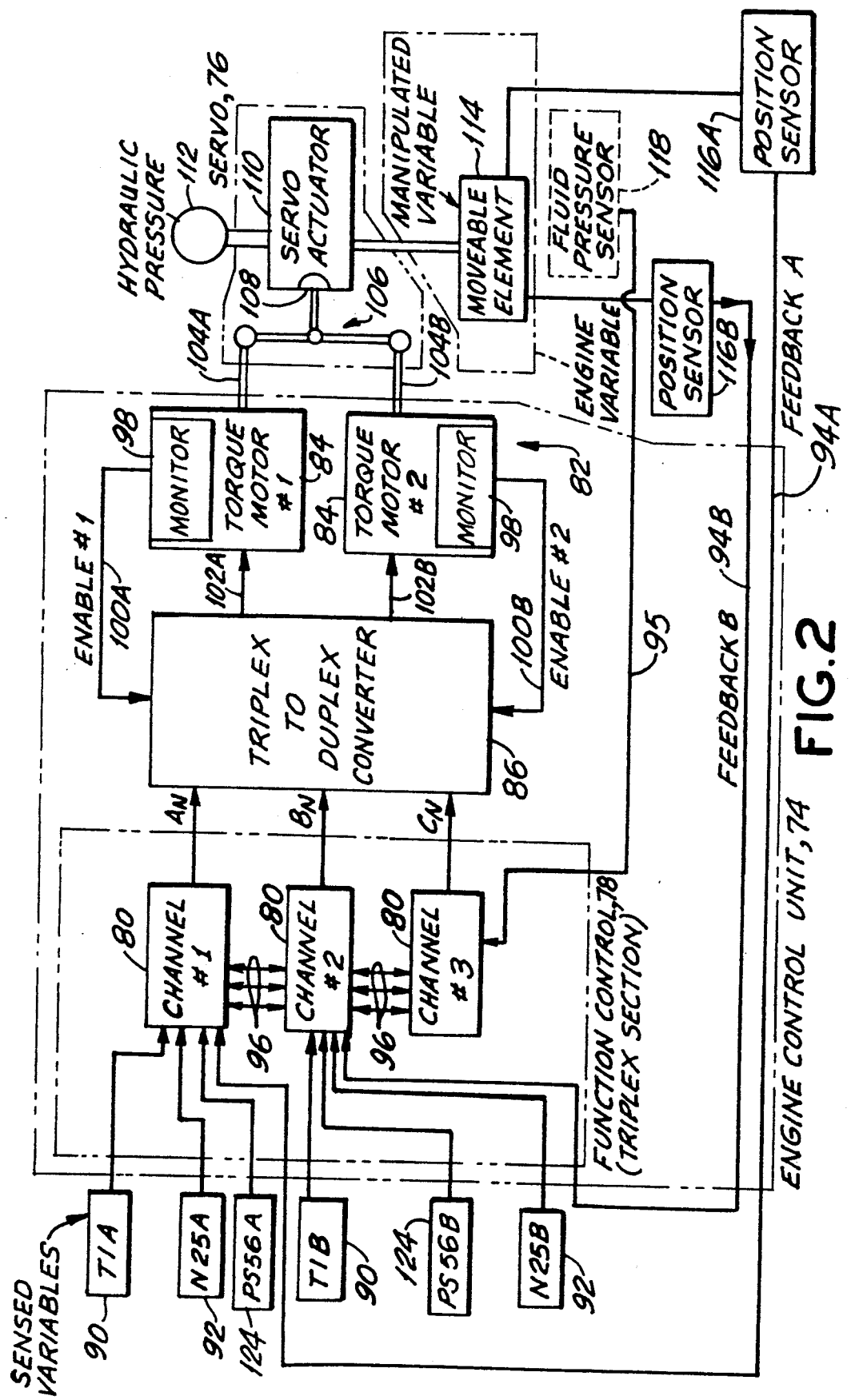
FIG. 2 is a block diagram of a redundant control network, in accordance with the invention, for an actuator of a single controlled variable.
Figure 3:
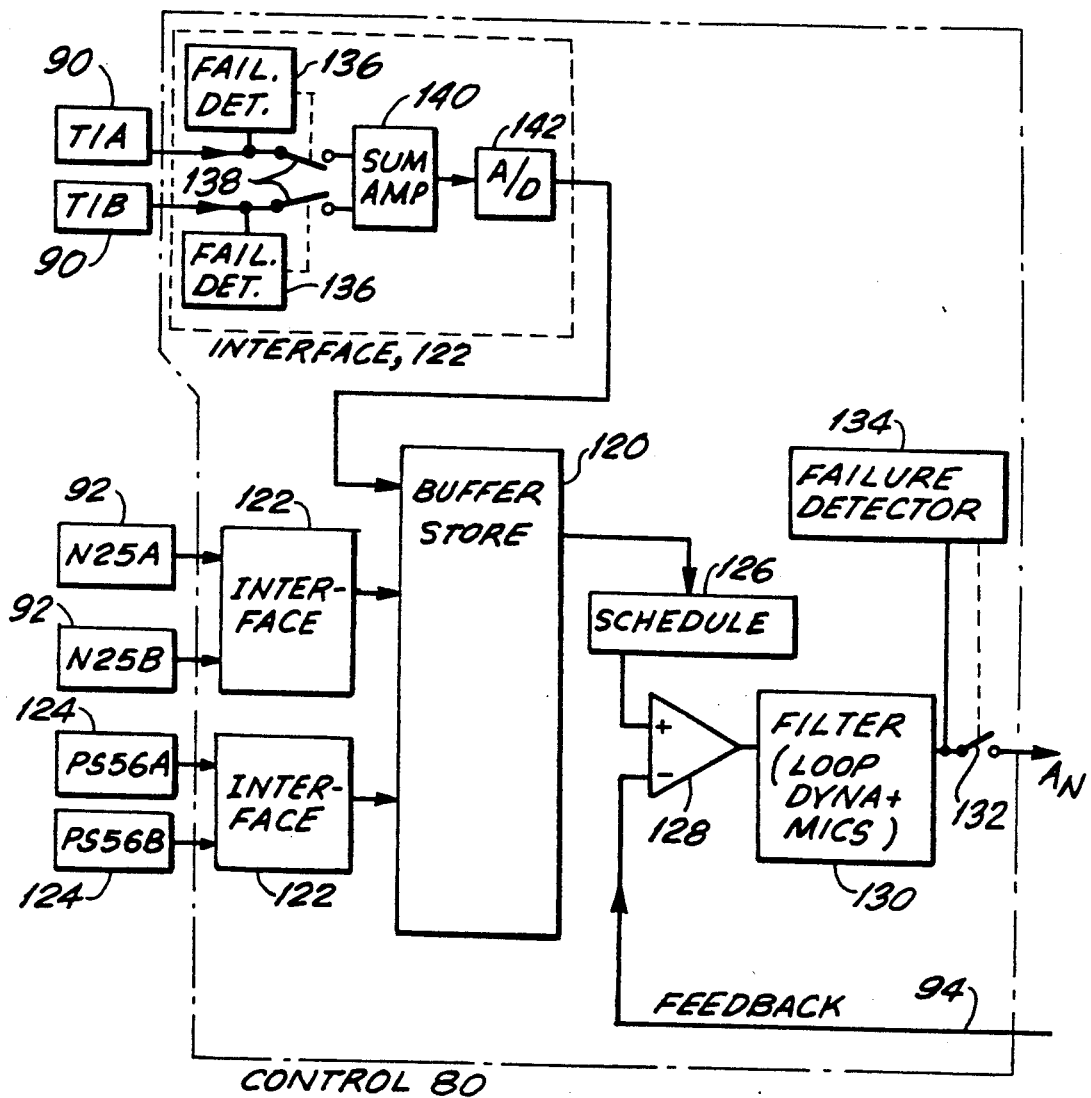
FIG. 3 is a block diagram of one of a plurality of redundant control units of a triplex control section in the network of FIG. 2.
Figure 4:
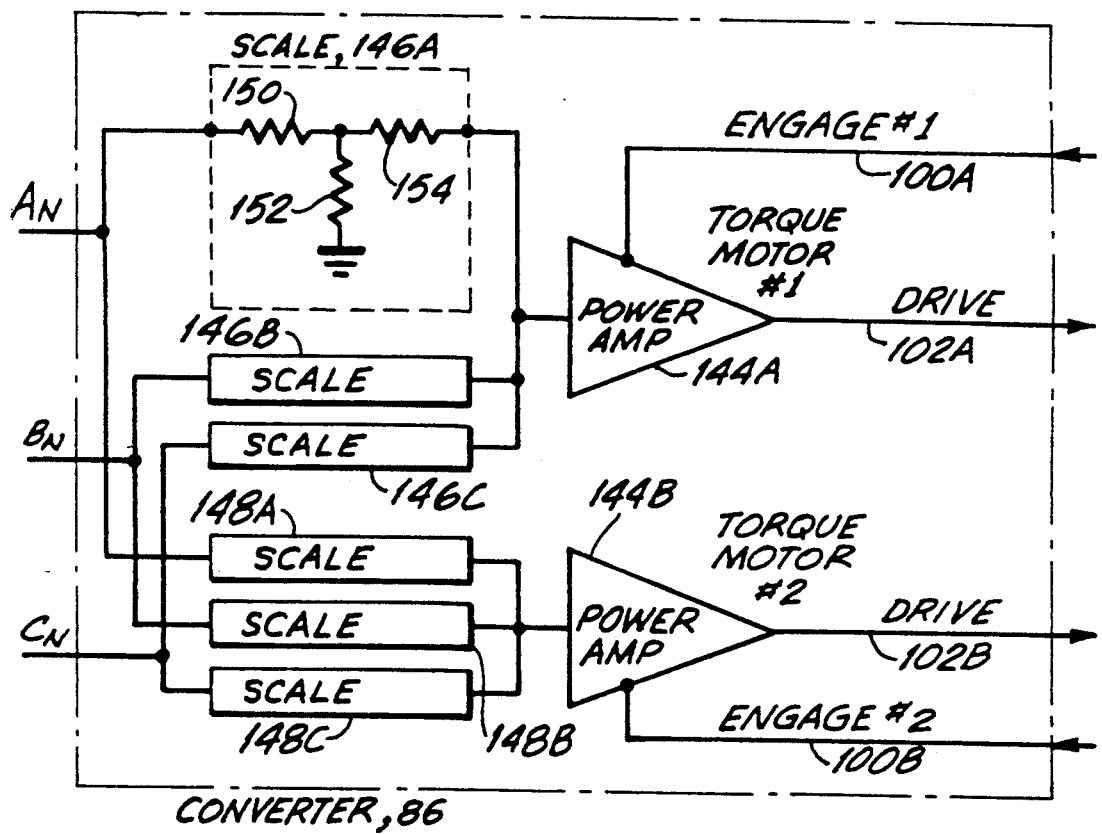
FIG. 4 is a block diagram of a converter of a triplex control system to a duplex control section in the network of FIG. 2.

FIGS. 2–4 show details in the construction of a preferred embodiment of the control system 12 in accordance with the invention. In FIG. 2, the three channels 80 of the function control 78 are arranged in parallel. The channels 80 read signals representing the sensed variables which are provided by various sensors, three pairs of sensors 90, 92, and 124 being shown by way of example. Each of the sensors 90 provides a measurement of the inlet temperature T1 of FIG. 1, the two temperature readings being identified in FIG. 2 as T1A and T1B. The sensors 92 provide readings of the shaft speed N25, the speed readings of the two sensors 92 being identified in FIG. 2 as N25A and N25B. Exhaust gas readings of two sensors are also provided, one of the sensors 124, by way of example, providing PS56A and the other providing PS56B. Other ones of the sensed variables can also be provided by pairs of sensors to the channels 80 of FIG. 2, the additional sensors having been deleted for clarity in FIG. 2. The three channels 80 provide output signals identified respectively as An, Bn, and Cn. Each of the torque motors 84 is responsive to a feedback signal on lines 94A and 94B. Cross channel data is coupled via lines 96 among the channels 80 for comparing signals of the various sensors.

Also shown in FIG. 2 is the interconnection of the converter 86 to the duplex motor section 82, and the connection of the duplex motor section 82 to the servo 76. The converter 86 receives the three signals An, Bn and Cn from the respective function control channels 80. Each of the torque motors 84 is provided with a monitor 98 which monitors the operational state of the torque motor 84 to output an enable signal for operation of the converter 86. There are first and second enable signals outputted via lines 100A and 100B respectively from a first and a second of the torque motors 84. Output signals of the converter 86 are coupled via lines 102A and 102B respectively to the first and the second of the torque motors 84. The first and the second of the monitors 98 enable input electrical signals on lines 102A and 102B, respectively, to power the torque motors 84 for driving links 104A and 104B, respectively, of a linkage 106. The linkage 106 sums mechanically movements of the links 104A–B to provide a single mechanical movement for operating a valve 108 of an actuator 110 of the servo 76. This could also be implemented by combining links 104A and 104B as a common armature driven by two Coils.

The actuator 110 comprises, in addition to the servo valve 108, a source 112 of hydraulic pressure which is employed by the valve 108 to displace a movable element 114. The element 114 represents one of the manipulated variables and may be, by way of example, a fuel valve of the burner 36 for regulating fuel provided by the inlet 48. To generate the feedback signal on lines 94A and 94B, position sensors 116A and 116B may be coupled to or included within the movable element 114 for outputting a signal on lines 94A and 94B, which represents the present position of the element 114, this position signal serving as the feedback signal. Alternatively, a sensor 118 of a parameter of a fluid, such as the pressure or temperature of a fluid, such as the fuel or the bypass air, may be employed for generating the feedback signal on line 95 in response to a sensing of one of the foregoing parameters, (pressure or temperature) of the fluid. The fluid sensor 118 is shown in phantom in FIG. 2 to indicate that the sensor 118 represents a source of feedback signal which is alternative to that generated by the sensors 116A and 116B.

FIG. 3 shows details in the construction of the first of the function control channels 80, each of the channels 80 having the same construction. The channel 80 includes a buffer store 120 for storing values of the sensed variables, and an interface 122 for coupling signals of the sensors 90 to the store 120. A further interface 122 connects signals of the sensors 92 to the store 120. By way of further example in the sensed variables applied to the control units 84, FIG. 3 shows also one of a pair of sensors 124 which output signals indicating values of exhaust gas speed via another interface 122 to the store 120. Exhaust gas readings of two sensors are also provided, one of the sensors 124, by way of example, providing PS56A via an interface 122 to the buffer store 120.

As shown in FIG. 3, the function control channel unit 80 further comprises a schedule 126 which may be fabricated as a read-only memory, a differential amplifier 128, a filter 130 such as a well-known lead-lag filter employed for establishing desired dynamic response to the engine control unit 74 (FIGS. 1 and 2), a switch 132 for disconnection of the output of the channel 80 in the event of faulty operation of the channel 80, and a failure detector 134 which monitors an output signal of the filter 130 for operating the switch 132. Additional failure detectors 136 (not shown) may also be placed in various interfaces 122 for monitoring output signals of the respective sensors 90, 92, and 124. Each of the detectors 136 is operative with a switch 138 which disconnects a sensor, such as one of the sensors 90, from the buffer store 120 in the event of a detection of faulty operation of the sensor. Also, the cross-channel signals at lines 96, employed for comparison of the sensor signals by a computer 140, allow selection of valid sensor signals to the channels 80 of the engine control unit 74. An output signal of the detector 138 is converted from analog to digital format by an analog-to-digital converter 142 for presentation to the buffer store 120. In the operation of the engine control unit 74, the average reading of the two input signals of each pair of input sensors, such as the sensors 90 or 92, or 124, is applied in digital format to the buffer store 120 to be used for subsequent addressing of the schedule 126.

FIG. 4 shows details in the construction of the converter 86 of FIG. 2. The converter 86 comprises two power amplifiers 144A, and 144B which output torque motor drive signals on the lines 102A–B, respectively, to the torque motors 84 (FIG. 2). The power amplifiers 144A and 144B are activated, respectively, by the enable signals on lines 100A and 100B. An input terminal of the power amplifier 144A is connected to output terminals of the three function control channels 80 (FIG. 2) for receiving their respective output signals An, Bn and Cn by a set of three scaling units 146A, 146B and 146C, respectively. Similarly, an input terminal of the power amplifier 144B is connected to output terminals of the three function control channels 80 (FIG. 2) for receiving their respective output signals An, Bn and Cn by a set of three scaling units 148A, 148B and 148C, respectively. The scaling units 146A–C constitute a summing input network, or fan-in circuit, to the amplifier 144A, and the scaling units 148A–C constitute an input summing network, or fan-in circuit, to the amplifier 144B. All of the scaling units 146A–C and 148A–C have the same circuitry, which circuitry may include, as shown by way of example, a resistor 150, as depicted in the scaling unit 146A, to provide a well-known resistor network.

In accordance with a feature of the invention, the use of the three scaling units 146A–C with their power amplifier 144A, and the use of the three scaling units 148A–C with their power amplifier 144B provide for a conversion of three signals outputted by the three function control channels 80 to two drive signals for the two torque motors 84 (FIG. 2). The format of the circuitry of the converter 86 is duplex, there being two sets of the scaling units, namely, the set of scaling units 146A–C and the set of scaling units 148A–C, and the two power amplifiers 144A–B. The duplex circuitry of the converter 86, in combination with the duplex arrangement of the torque motors 84, and the triplex arrangement of the function control channels 80 constitute the redundant network of an engine control unit 74 of the control system 12.

As may be seen With reference to FIGS. 1–4, upon proper operation of both of the torque motors 84, the duplex motor section 82 drives the servo valve 108 through both of the links 104A–B. Upon failure of any one of the torque motors 84, signals of the function control channels 80 are still able to operate the servo valve 108 via the remaining torque motor 84. Also, the use of the feedback signal on line 94 in combination with the command signal of the schedule 126 provides for a closed-loop operation of the servo valve 10B, with the dynamic response of the loop being provided with the aid of the filter 130. Closed loop operation is maintained even if one of the torque motors 84 fails, or if one of the channels 80 of the function control 78 fails.

Thereby, the invention has accomplished the redundant control of the output parameters of respective ones of the engine control units 74 of the control system 12 using different amounts of redundancy in successive stages in each of the engine control units 74. This produces a decrease in weight and in complexity of the components of the control system 12 while retaining proper control of the engine 10.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A redundant network for control of an actuator, the network comprising:

a control system comprising three electronic control channels interconnected in a triplex redundant control;

a servo actuator comprising a servo valve and a duplex redundant input driver of the servo actuator for controlling an output variable wherein said duplex driver comprises two driver elements connected to said servo valve and dual amplifier channels outputting signals respectively to said driver elements; and means comprising a fan-in circuit connecting each of said control channels to said amplifier channels for converting a triplex redundant control to a duplex redundant control, said converting means interconnecting said control system with said actuator.

2. A network according to claim 1 further comprising means for feeding back a feedback signal from said actuator to each of said control channels, said feedback signal providing the status of an output variable of said network controlled by said actuator.

3. A network according to claim 2 wherein said feedback comprises means for sensing the output variable of said network.

4. A network according to claim 2 wherein said feedback means is a position feedback comprising means for sensing a position of said output variable.

5. A network according to claim 1 wherein:

each of said driver elements of said actuator comprises a torque motor with a movable member mechanically connected to said servo valve, said network including a monitor for sensing electrical integrity of the torque motors.

6. A network according to claim 5 wherein said monitors output enable signals to respective ones of said amplifier channels.

7. A network according to claim 5 further comprising a further one of said monitors, there being one of said monitors for each of said torque motors, each of said monitors outputting an enable signal to a corresponding one of said amplifier channels.

8. A network according to claim 7 wherein each of said monitors senses current in a torque motor.

9. A network according to claim 8 wherein, at each of said monitors, the enable signal is outputted upon the presence of values of current indicating acceptable operation of the torque motor, the enable signal changing to a disable signal upon the presence of value of current indicating faulty operation of the torque motor.

10. A network according to claim 9 further comprising means for feeding back a feedback signal from said actuator to each of said control channels, said feedback signal providing the status of an output variable controlled by said actuator.

11. A network according to claim 10 wherein said feedback means comprises means for sensing an output variable of said network.

12. A network according to claim 10 wherein said feedback means is a position feedback comprising means for sensing a position of said output variable.

13. A control system for operating a device having mechanical parts, the system comprising:
- an actuator having a plurality of input ports each of which comprises means for transforming an electric signal to mechanical motion, the mechanical motion being applied to one of said mechanical ports for driving the port;
- a set of control channels each of which drives said actuator, said set of control channels providing redundant driving of said actuator, the number of control channels in said set being greater than the number of said actuator input ports;
- means for distributing output signals of all of said control channels among all of said actuator input ports;
- a plurality of amplifier channels outputting signals respectively to said transforming means in respective ones of said actuator input ports; and
- a fan-in circuit wherein a portion of an output signal of each of the control channels is summed at said input of each of the respective ones of said power amplifiers.

14. A system according to claim 13 wherein the number of said control channels is greater by one than the number of said actuator input ports.

15. A system according to claim 14 wherein there are three of said control channels and two of said actuator input ports.

16. A system according to claim 15 wherein:
- said actuator includes a servo valve operatively coupled to all of said transforming means; and
- each of said transforming means comprises a monitor for outputting an enable signal to a corresponding one of said amplifier channels of said distributing means.

17. A system according to claim 16 further comprising:
- means for feeding back a feedback signal from said actuator to each of said control channels, said feedback signal providing the status of an output variable of the system controlled by said actuator; and
- wherein said feedback means comprises means for sensing said output variable.

18. A system according to claim 16 further comprising:
- means at each of said control channels for accepting a feedback signal from said actuator, said feedback signal providing the status of an output variable of the system controlled by said actuator; and
- wherein said feedback means is a position feedback comprising means for sensing a position of an output variable of the system.

19. A system according to claim 16 wherein:
- each of said transforming means comprises a torque motor, and each of said monitors senses current in a torque motor; and
- at each of said monitors, the enable signal is outputted upon the presence of values of current indicating acceptable operation of the torque motor, the enable signal changing to a disable signal upon the presence of value of current indicating faulty operation of the torque motor.

* * * * *